US008271323B2

(12) United States Patent
Chatow et al.

(10) Patent No.: US 8,271,323 B2
(45) Date of Patent: Sep. 18, 2012

(54) PUBLICATION PLANNING BASED ON ESTIMATED CONTENT USAGE PARAMETERS

(75) Inventors: Udi Chatow, Palo Alto, CA (US); Andrew E Fitzhugh, Menlo Park, CA (US); Kay-Yut Chen, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 411 days.

(21) Appl. No.: 12/260,643

(22) Filed: Oct. 29, 2008

(65) Prior Publication Data

US 2010/0106600 A1 Apr. 29, 2010

Related U.S. Application Data

(60) Provisional application No. 60/991,704, filed on Nov. 30, 2007.

(51) Int. Cl.
*G06Q 30/00* (2012.01)

(52) U.S. Cl. ...................................................... 705/14.1
(58) Field of Classification Search .................. 705/14.1
See application file for complete search history.

(56) References Cited

U.S. PATENT DOCUMENTS

| 8,190,460 | B1* | 5/2012 | Andersen et al. | ............. 705/7.12 |
| 2006/0293951 | A1* | 12/2006 | Patel et al. | ...................... 705/14 |
| 2008/0243608 | A1 | 10/2008 | Chatow | |
| 2008/0262917 | A1* | 10/2008 | Green et al. | .................... 705/14 |
| 2008/0270358 | A1 | 10/2008 | Chatow | |
| 2009/0171750 | A1* | 7/2009 | Zhou et al. | ...................... 705/10 |

FOREIGN PATENT DOCUMENTS

WO WO 00/54192 * 9/2000

* cited by examiner

*Primary Examiner* — Daniel Lastra

(57) ABSTRACT

Planning a publication includes receiving information about an event, accessing a database of profiles that relate in general to content usage, and using a search engine to match the profiles with the event information to estimate parameters for using content for the event. The publication is planned according to the estimated usage parameters.

24 Claims, 4 Drawing Sheets

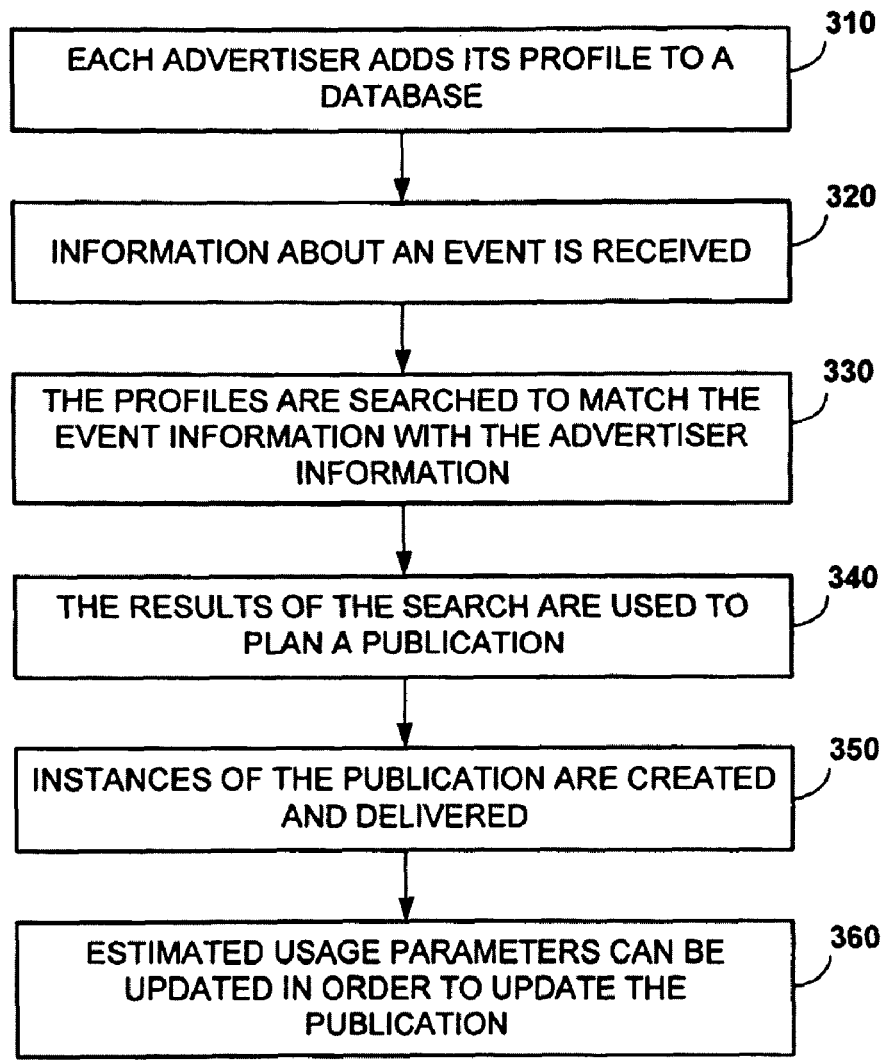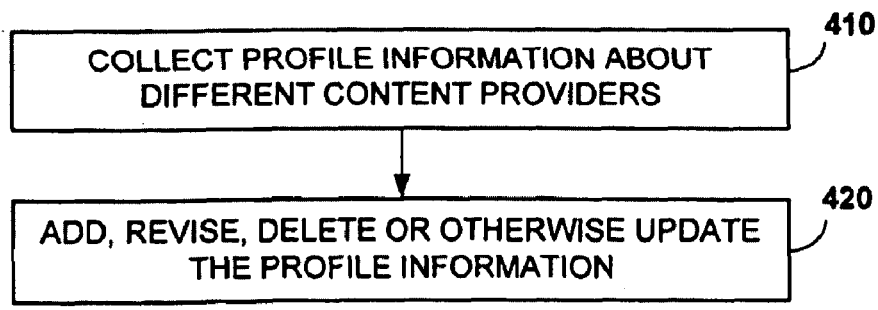

PUBLICATION PLANNING BASED ON ESTIMATED CONTENT USAGE PARAMETERS

CROSS REFERENCE TO RELATED APPLICATIONS

This application claims the benefit of U.S. Provisional Application Ser. No. 60/991,704, filed Nov. 30, 2007, titled "Publication Planning Based On Estimated Content Usage Parameters" which is hereby incorporated by reference herein as if reproduced in full below.

BACKGROUND

During planning of a publication, ad sellers negotiate with ad buyers as to price, size and placement of advertisements in the publication. Negotiations can be time-consuming, slow, and laborious.

Consider advertisements for the release of a new commercial product (e.g., a car, movie). The release of a new product is typically accompanied by a national advertising campaign. Advertisements are used to ramp up public interest prior to the product release, and maintain the interest during the product's run. An advertising campaign might include placing advertisements in magazines and other printed publications. Given its slow nature, negotiations for advertisements are typically conducted long before the publications go to print.

BRIEF DESCRIPTION OF THE DRAWINGS

FIG. 3 is an illustration of a method of publication planning in accordance with an embodiment of the present invention.

FIG. 4 is an illustration of a method of collecting profile information in accordance with an embodiment of the present invention.

DETAILED DESCRIPTION

Figure 1:
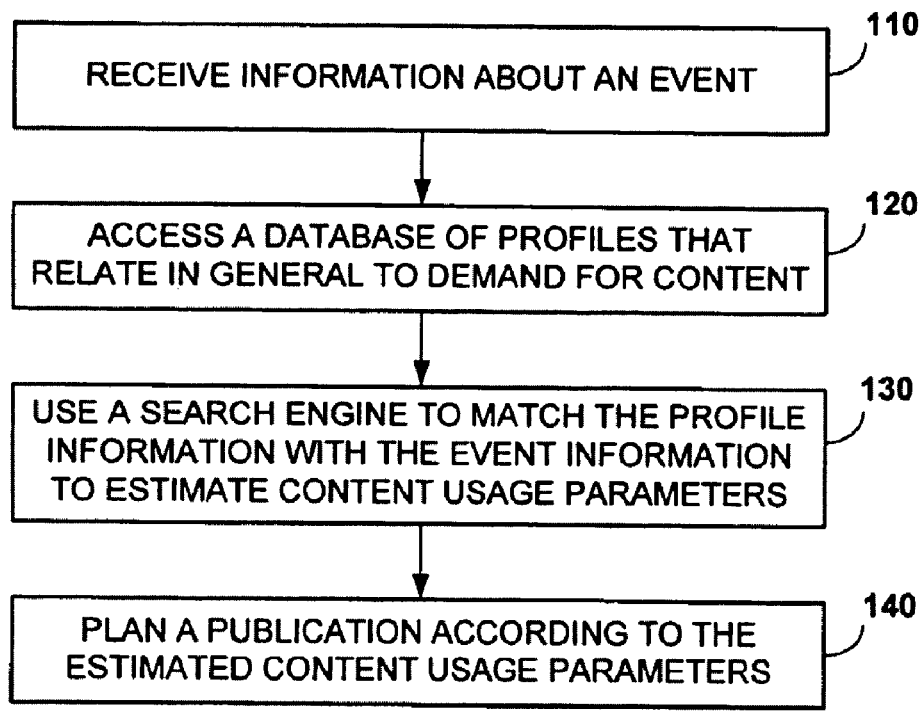
FIG. 1 is an illustration of a method of publication planning in accordance with an embodiment of the present invention.

As shown in the drawings for purposes of illustration, the present invention is embodied in the planning of publications. Content of a publication may include articles, pictures, designs, advertisements, etc. Instances of the publication may be delivered electronically (e.g., as multimedia, blogs, RSS feeds), as print products (e.g., magazines, newsletter, catalogs, flyers), or in some other form.

The publication is planned around an event. The event may be a single occurrence, or it may be a series of occurrences. The event may be public or private.

As a first example, a large company is planning a major product release. The company wants to develop an advertising campaign that ramps up public interest in the weeks leading up to the product release, sustains the interest during the product release (which might be over several months), and maintains the public interest at a lower level of interest after the product release had ended.

As a second example, a small organization is holding a social event. The organization wants to publish a magazine commemorating the event. The organization has no plans to ramp up interest prior to the event, nor has it any desire to sustain interest after the social event has occurred. However, the organization wants to purchase some articles of interest to include in the magazine. In addition, the organization wants to include advertisements in the magazine in order to subsidize the cost of the magazine.

Reference is made to FIG. 1, which illustrates a method of planning a publication. At block 110, information about an event is received.

Information about the nature of the event might indicate the objective for holding the event (e.g., a product release, increase brand awareness), a call for action (e.g., purchase within a limited time), how the event will be publicized (e.g., advertisements in printed products, billboards, television commercials, web sites), etc. The location information might indicate whether the event is local, national or global, whether certain markets are more important than others.

The time information might indicate whether the event is a single occurrence, or a series of occurrences. The time information might indicate times of different activities at different locations. The time information might include one or more milestones for each occurrence. Time information might also include items such as timing of incentive offerings during the event.

At block 120, a database of profiles is accessed. The profiles contain information that relates to general usage of advertisements and other content. For instance, an advertiser might submit a profile including general information about the types of advertisements it offers, the different formats that are available, and a pricing structure for the different formats. The advertiser's profile might also include various issues for negotiation.

At block 130, a search engine is used to match the profile information with the event information. Results of the search yield estimated parameters for using content for the event. These parameters can also provide insight about demand for the event. For instance, higher demand might be indicated by higher prices that advertisers are willing to pay or that other content providers are asking.

At block 140, the publication is planned according to the estimated content usage parameters. In some embodiments, the estimated demand can be used to determine price, size and placement of content before negotiations begin. The only thing left for negotiations is to finalize the type, prices and layout of the content that will be used. Thus, by minimizing negotiations, time is spent more efficiently, resources are saved, and the whole planning process is sped up greatly.

In some embodiments, the content does not even have to be specified. Only the estimated usage parameters may result from the search. The content can be identified during negotiations.

In some embodiments, the negotiations are totally eliminated. All issues for negotiation are populated for the highest value that fits the publisher's criteria. The pricing mechanism for content enables an automatic—highest bid to win space in the publication. The publisher is allowed to control and filter the ad types.

Thus, usage parameters are estimated prior to negotiation, which makes publication planning far more efficient. Eliminating the negotiations altogether can result in an on-demand system.

Moreover, a method according to an embodiment of the present invention can be used by large publishers and individuals alike. A person with little or no knowledge about publications can connect with advertisers and other content providers. Barriers to entry are removed, and smaller publishers are empowered.

Figure 2:
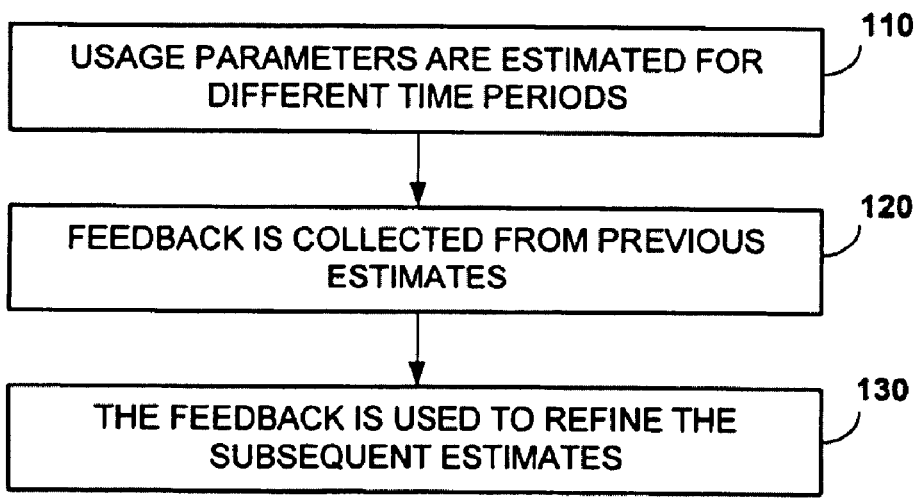
FIG. 2 is an illustration of a method of refining the publication planning in accordance with an embodiment of the present invention.

Reference is now made to FIG. 2. At block 210, usage parameters are estimated for different time periods. The usage parameters for each time period can be estimated as illustrated in FIG. 1. The usage parameters for all of the periods can be estimated at the same time, for instance at the beginning of an advertising campaign. However, estimating the usage parameters is not so limited. For instance, the usage parameters for a time period can be estimated shortly before that period begins.

At block 220, feedback is collected from previous estimates. The feedback indicates accuracy of the earlier estimate.

At block 230, the feedback is used to refine the subsequent estimates. For example, if the feedback indicates that estimated price for a time period was too high, subsequent estimates can be scaled back, or the profile information could be revised so the earlier estimates are more in line with the feedback. The original estimate might have been off because it was based on information that was outdated, or it might be off because of a subsequent event that changed the demand for the content (e.g., a sudden increase in popularity of a related product that increases demand for content and articles associated with that product), or it might be off for some other reason.

A method according to an embodiment of the present invention can be applied to publications that are printed by conventional printing presses. Usage parameters are estimated for each period of a time schedule, and instances of the publication are printed at the beginning of the time schedule.

However, the method is especially advantageous for publications that are printed with on-demand printing systems such as digital printing presses. A merger of on-demand printing and on-demand content allows print runs to be made according to a schedule. Feedback can be used to refine estimates and the number of copies printed for a given time period. Adjustments to content can be made shortly before printing. Since negotiations are not needed, ad space can be reduced automatically and prices can be changed to reflect the new layout.

Contrast this to traditional printing. Traditional printing does not take advantage of feedback to make adjustments. On-demand printing can. On-demand printing allows for initial runs that are smaller, but that can be adjusted as an event progresses. If consumer interest ramps up during the initial campaign (e.g., web site hits, more people visiting show room, positive results from surveys), usage estimates can be revised upward, and publishers can increase advertising space. Traditional approaches generate feedback to make the next advertising campaign more effective. In the merger of on-demand printing and on-demand content, the feedback is used to make the present campaign more effective.

Reference is made to FIG. 3, which illustrates a method that is used by a pool of advertisers. At block 310, each advertiser adds its profile to a database. Each profile includes information about the products and services they advertise, the type of people they advertise to, the types of advertisement formats they offer (e.g., full page layouts), what they are willing to pay for each format, etc. The profiles do not provide information for specific events (although they could). Rather, the profiles collectively provide general information about a pool of advertisers.

Consider the following example of a profile. The profile might include the following information from an advertiser for a print product:

Product type or segment description (e.g., New Hybrid 4*4 SUV car).

Event type (e.g., product launch).

Place of distribution (e.g., California).

Publication/content linkage, i.e., segment description of publication/content type (e.g., automotive magazines/outdoor sports magazine).

Willing to pay/per time slot (per page) (for example, $5 from December 15 to December 25, $3 from December 26 to January 15, $1 from January 16 to-March 1).

Ad size (e.g., full page letter size).

Preferred paper type (e.g., dull book 100#).

Colors (e.g., 4 colors).

Finish (e.g., gloss varnish.

At block 320, information about an event is received. For instance, the information might be provided by a publisher, an ad agency, or some other party.

At block 330, the profiles are searched to match the event information with the advertiser information. The search results may include a list of advertisers who meet the specified criteria. The advertisers may be ranked according to criteria such as price, relevance to the event, strategic or brand value to the publication (for example, perceived value of a well-known company's ad in niche magazines could be high), and criteria based on complementary and competitive considerations.

At block 340, the results of the search are used to plan a publication. For instance, based on the types of layouts and prices revealed in the search, a preliminary layout of content may performed. At the same time, advertisers may be selected from the list and contacted about supplying the advertisements at their advertised prices. Some negotiations might follow, but the negotiations will be held merely to finalize business transactions. In an on-demand system, however, no negotiations would be necessary, and all issues related to advertisements would be addressed by the search results.

The search results may be used to help publishers allocate space in printed publications and select ads that will yield the highest revenue. A single campaign can have different pricing based on time and place of events.

A search can be performed for multiple events. The search results would helps publishers, who receive information about multiple events, to decide which events to promote and how much advertising space to allocate to each event.

The method is advantageous for a large company that is planning an event, and wants to move quickly, but doesn't have an unlimited amount of time to work with advertisers. The method is also advantageous for a small company or individual who doesn't have the market research, money, and other resources, to identify and negotiate with advertisers. A person with little or no knowledge about advertisements can use the method to connect with advertisers. Thus, the method removes barriers to entry and empowers smaller publishers.

The method also offers advantages to advertisers. It helps advertisers improve targeting and timing of their advertisements. The method increases the exposure of certain lesser-known advertisers. It allows advertisers to shop their content to publishers and other customers. It also exposes advertisers to new opportunities.

The method helps both publishers and advertisers allocate their resources more efficiently. More planning can be performed prior to negotiations. Fewer resources and less time are devoted to negotiations.

Advertisements aren't included for locations where they won't be seen. Exposure will be maximized in locations that are most likely to have impact.

At block 350, instances of the publication are created and delivered. At block 360, the estimated usage parameters can be updated in order to update the publication.

A method according to an embodiment of the present invention is not limited to advertisements. It can be applied to other types of content, such as articles and pictures. Authors and photographers can add their profiles to the database. The profiles can indicate the type of content (e.g., photo, article), the segment (e.g., entertainment, educational, sports), keywords describing the content, the types of publications the content should be included in, the type of audience who is likely to be interested in the content, locations where interest is strongest, price per content, etc. The profile can also specify types of events for which the content should be considered. For example, a profile might include an upcoming schedule of events related to associated content, segments of events (e.g., entertainment, educational, sports), etc.

Reference is now made to FIG. 4, which illustrates a method of generating a database of profiles. At block 410, profile information is collected about different content providers. Information could be obtained actively. People could be asked to fill out questionnaires, surveys, registration forms, etc. Information could be provided by parties knowledgeable about other parties. Information can also be obtained passively. Public databases and private databases (e.g., CRMS) could be searched, data could be mined, previous activities with a service provider (e.g., past profiles, requests, queries) could be examined, etc.

At block 420, profile information could be added, revised, deleted or otherwise updated at any time. If feedback indicates that database information is out of date or otherwise inaccurate, the database information can be corrected.

Figure 5:
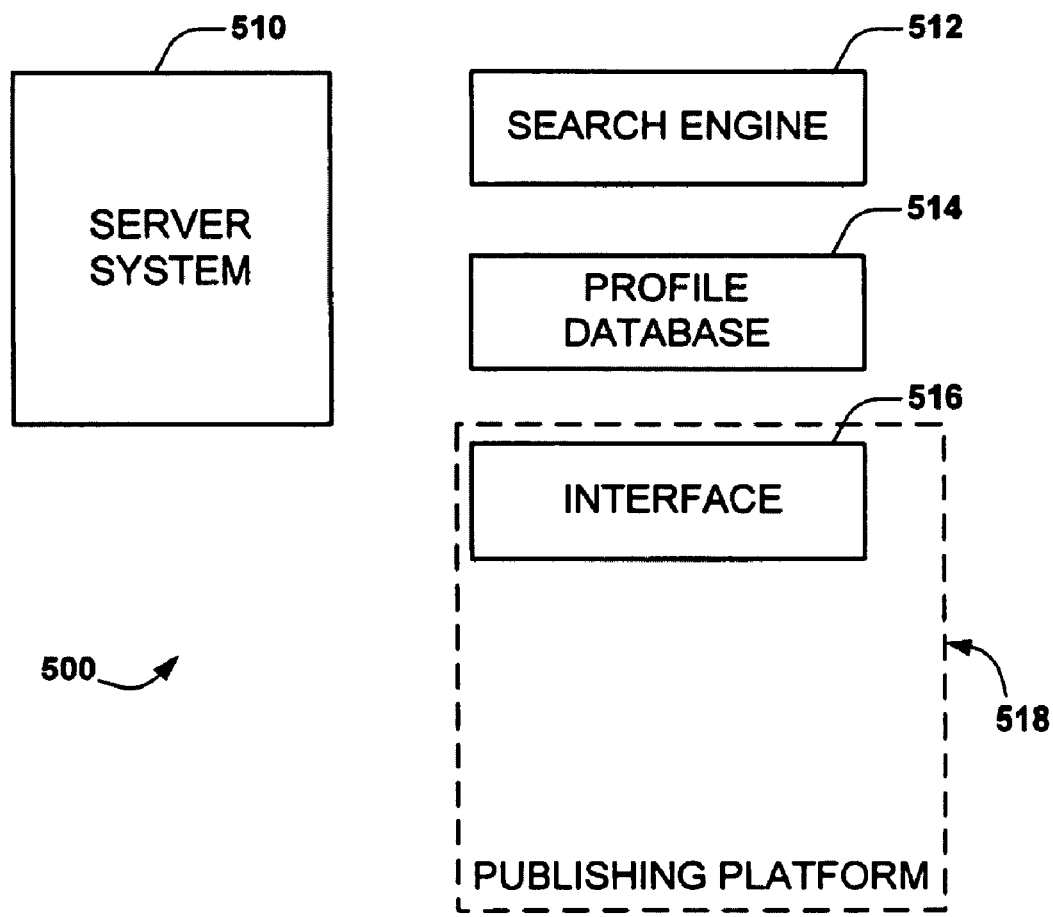
FIG. 5 is an illustration of a system in accordance with an embodiment of the present invention.

Reference is made to FIG. 5, which illustrates a system 500 for planning publications. The system 500 includes a server system 510 that communicates with client devices over a network. Examples of client devices include, without limitation, computers. The network is not limited to any particular type. The network could include a computer network such as a LAN, the Internet, a cellular network, a peer-to-peer network, a personal area network (e.g., a network that uses Bluetooth), etc.

The server system 510 may include one or more servers for providing a search engine 512 and a database 514 of profiles. The server system 510 may also provide an interface 516 for supplying information to the server system 510. The interface 516 can be implemented as a dedicated application or as data (e.g., web pages, forms, applets, script) that is downloaded by a client device to give functionality to a web browser or some other application. A web-based system is particularly advantageous, since it is available to anyone who has Internet access.

The interface 516 may query a party for profile information. For example, the interface 516 might display a set of forms (e.g., html forms, pdf fillable files) that content provider fills in. An advertiser or other content provider can use the interface to supply profile information. Customers can use the interface to supply event information and other customer information. These parties could submit information by means other than an interface (e.g., by e-mail).

The system 500 can be controlled by a service provider. The service provider can interface with content providers to maintain the profile database. The service provider can also receive customer information and use the server system to estimate demand.

In some embodiments, the database 514 could be proprietary. In some embodiments, a portion of the database 514 could be propriety, with the remainder being available to the public.

A system according to the present invention is not limited to a client-server architecture. Other architectures, such as peer-to-peer, could be used instead of, or in addition to, the client-server architecture.

In some embodiments, the interface 516 can be integrated with the publishing platform 518 disclosed in U.S. Ser. No. 11/741,718 filed Apr. 27, 2007, U.S. Patent Publication No. 2008/0270358, which is incorporated herein by reference. An integrated publishing platform 518 can incorporate the method of FIG. 1 to plan a publication. The integrated publishing platform 518 can then be used to select members (content providers, advertisers, designers, editors, print service providers, etc.) who create and deliver the publications.

In some embodiments, the integrated publishing platform 518 can also create customized instances of a publication. The instances could be customized according to recipient information, as disclosed in U.S. Ser. No. 11/694,914 filed Mar. 30, 2007, U.S. Patent Publication No. 2008/0243608, which is also incorporated herein by reference. As part of this customization, a recipient could specify the level of advertising that is allowable. For example, a recipient or subscriber might be willing to pay full cost for an instance, provided that the instance does not contain advertising. Or a recipient or subscriber might accept a certain amount of advertising in an instance so that the cost of the instance is subsidized in part by advertisements.

As part of the customization, other advertisements of interest to the recipient may be added (that is, advertisements targeted to the specific interests of a recipient may be added). As part of the customization, certain advertisements could be filtered out.

The integrated publishing platform 518 may be used to identify print service providers who can print instances of a publication. Certain print products might require a certain print media type or color properties (e.g., CMYK, CMYKcm, hexachrome or larger gamut). Moreover, creating a print product can involve more than simply printing. A print product might require specialty services, such as applying bindings, special finishes, etc. The integrated publishing platform 518 may display information about different print service providers, and enable a customer to select one or more of them to create their print products.

The integrated publishing platform 518 could distinguish different print service providers by different capability and geography. Print service providers could be selected according to efficient resource allocation and geography. For instance, an event might be of interest in certain locations. The integrated publishing platform 518 can identify print service providers in locations of interest. Picking a print service provider in a desired location can reduce delivery costs to that location and, therefore, reduce the pricing. Print service providers can track changes in loads over time. Such information allows print service providers to adjust their pricing so they can take more jobs at low peak times. In addition, price bids can change based on time to delivery and how much excess capacity the printers have at planned times for print production.

The creation of publications is scalable. At one end of the scale is the creation of widely circulated professional publications. At the other end of the scale is the creation of publications for a select few recipients.

The integrated publishing platform 518 greatly reduces the complexity of print design, subscription management, advertising, printing, content harvesting, and distribution. It makes creating a magazine or other print product much easier for the small-scale publisher.

Some embodiments of the present invention may be configured for advertisers and other content providers to submit profile information and customers such as publishers to search the profile information. However, other embodiments of the present invention are not so limited. Other embodiments of the present invention can be configured to allow publishers and other customers to submit profile information, and allow advertisers and other content providers to estimate demand for their content during an event or set of events.

Figure 6:
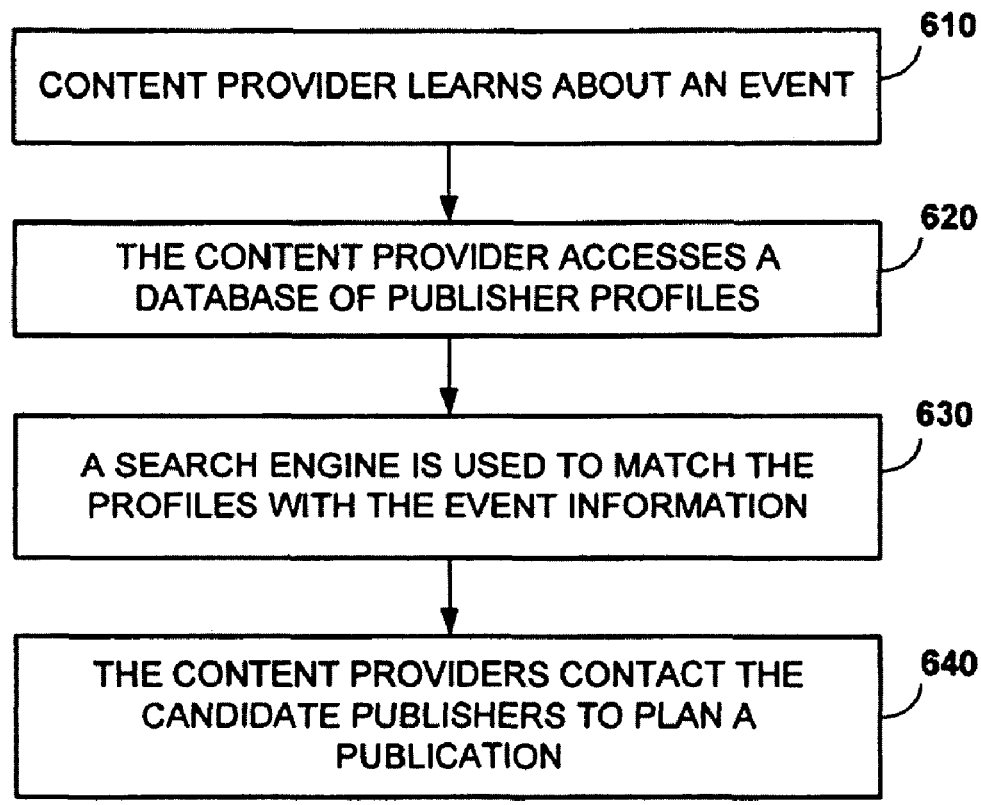
FIG. 6 is an illustration of a method of publication planning in accordance with an embodiment of the present invention.

Reference is now made to FIG. 6. At block 610, a content provider learns about an event. At block 620, the content provider accesses a database of publisher profiles. The profiles indicate what the publishers are willing to pay for different advertisements.

At block 630, a search engine is used to match the profiles with the event information. Results of the search yield an estimated demand for the content for each given time and location of the event (for instance, higher demand might be inferred by higher prices that advertisers are willing to pay). The search can also yield a list of candidate publishers. The candidate publishers can be ranked according to some criteria. The candidate publishers could also be ranked by a rating or a relative ranking as provided by previous collaborators, cost of services quotes, and areas of specialization, user endorsements and other competitive characteristics, such as the ability to meet time-critical deadlines.

In some instances, the content provider might learn about an event by searching the database, whereby the functions at blocks 610 and 630 are performed together. For instance, certain publisher profiles might specify events, which the search reveals.

At block 640, the content providers contact the candidate publishers to plan a publication. For example, the estimated demand could be used as a starting point to negotiate pricing for each time and location.

Figure 7:
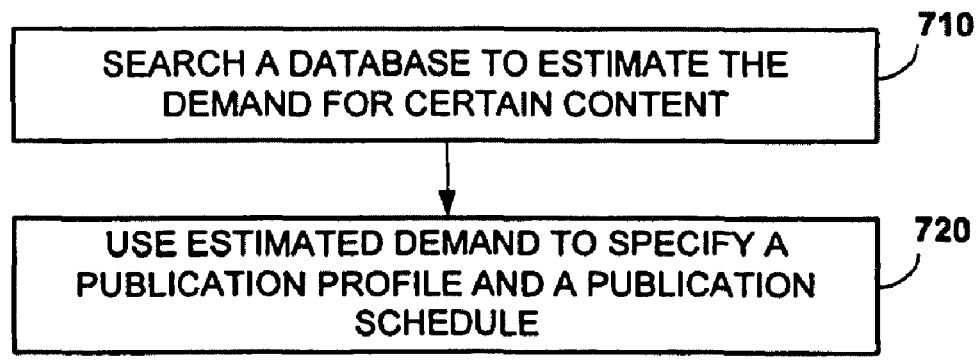
FIG. 7 is an illustration of a method of publication planning in accordance with an embodiment of the present invention.

Reference is now made to FIG. 7. The estimated demand could be used for publication scheduling and planning. At block 710, a publisher searches a database to estimate the demand for certain content. At block 720, the estimated demand is used to specify a publication profile and a publication schedule. To facilitate this kind of non-advertising based interaction, relevant profiles include information about events associated with content.

Consider the example of an upcoming beach surfing competition and a surfing magazine. Assume at the same time that a particular photographer is opening or running a gallery exhibition of beach photos. Assume also that profiles are entered into a database by organizers of the competition and also by the photographer. The organizers' profile will present demand in the form of time of publications, geographical reach of publication, publication, segment (outdoor/sports/entertainment), related articles, etc. The photographer's profile will present demand in the form of the gallery schedule, a description of content that will be exhibited, etc. Searching the database will allow a publisher to identify these events and coordinate the schedule of publication with the surfing competition and also include content of the exhibit in a particular issue (because of the synergy between the publication and the gallery content).

The invention claimed is:

1. A method of planning a publication, the method comprising:
   receiving, by a system having a computer, information about an event;
   accessing, by the system, a database of profiles of respective content providers, wherein each of the profiles contains information describing a corresponding type of content and a corresponding type of audience of a respective one of the content providers;
   using a search engine in the system to match the profiles with the event information to estimate usage parameters for publishing content for the event; and
   planning the publication according to the estimated usage parameters for the event.

2. The method of claim 1, wherein the event covers different geographic locations over different times; and wherein the usage parameters are estimated for each of the geographic locations for each of the times.

3. The method of claim 1, further comprising obtaining feedback to refine subsequent estimates of the usage parameters.

4. The method of claim 1, wherein the usage parameters are estimated for an initial portion of the event; and wherein the estimates are revised based on feedback for at least one subsequent portion of the event, wherein the feedback indicates accuracy of the usage parameters estimated for the initial portion.

5. The method of claim 4, further comprising printing the publication on-demand according to a time schedule, wherein the printing is based on the estimated usage parameters for the initial portion and the subsequent portion.

6. The method of claim 4, wherein the usage parameters are estimated without further negotiation, whereby on-demand content is merged with on-demand printing.

7. The method of claim 1, wherein the content includes advertising content, and wherein search results according to the matching of the profiles with the event information are used to determine an advertising layout and advertising price.

8. The method of claim 1, wherein the estimated usage parameters are used to prioritize and evaluate different content for different locations and times.

9. A method of planning an advertisement campaign, the method comprising:
   determining demand for content according to the usage parameters estimated by the method of claim 1; and
   using the demand to specify a publication profile and publication schedule.

10. The method of claim 1, wherein the information describing the corresponding type of content comprises information describing a type of product or service to be advertised by the respective content provider.

11. The method of claim 10, wherein each of the profiles further includes information describing an advertisement format for an advertisement of the respective content provider.

12. The method of claim 1, wherein each of the profiles further includes keywords of content to be published by the respective content provider.

13. The method of claim 1, further comprising:
   identifying a plurality of the content providers based on matching the profiles with the event information; and
   ranking the plurality of the content providers according to at least one criterion.

14. The method of claim 13, wherein planning the publication comprises allocating space in the publication for content of selected one or more of the plurality of content providers.

15. The method of claim 14, further comprising selecting content of the selected one or more of the plurality of content providers to include in the publication to enhance revenue.

16. A method of dynamically pricing advertisements for printed products, the method comprising:

estimating, by a system having a computer, a demand based on profiles of advertisers, wherein each of the profiles contains information describing a corresponding type of content and a corresponding type of audience of a respective one of the advertisers;

using, by the system, the estimated demand to determine an initial advertising price; and adjusting, by the system, the price as a function of time or place of publication.

17. A system comprising:

an interface to receive information about different events;

a database of profiles of respective content providers, wherein each of the profiles contains information describing a corresponding type of content and a corresponding type of audience of a respective one of the content providers; and a computer to:
   search the database to match the profiles with the events to estimate content usage parameters for the different events; and
   plan a publication according to the estimated usage parameters.

18. The system of claim 17, wherein the interface includes a web-based interface.

19. The system of claim 17, wherein the interface is integrated with a publishing platform having the computer.

20. The system of claim 19, wherein a particular one of the events is of interest to certain locations; and wherein the publishing platform is configured to identify print service providers in those certain locations.

21. The system of claim 17, wherein the information describing the corresponding type of content comprises information describing a type of product or service to be advertised by the respective content provider.

22. The system of claim 21, wherein each of the profiles further includes information describing an advertisement format for an advertisement of the respective content provider.

23. The system of claim 17, wherein each of the profiles further includes keywords of content to be published by the respective content provider.

24. The system of claim 17, wherein the computer is to further:
   identify a plurality of the content providers based on matching the profiles with the information about the different events; and
   rank the plurality of the content providers according to at least one criterion.

* * * * *